July 12, 1938.  R. D. PIKE  2,123,660

MAKING BEARINGS

Filed April 17, 1935  2 Sheets-Sheet 1

INVENTOR.
Robert D. Pike.

BY

Chas. E. Townsend.
ATTORNEY

July 12, 1938. R. D. PIKE 2,123,660
MAKING BEARINGS
Filed April 17, 1935 2 Sheets-Sheet 2

INVENTOR.
Robert D. Pike.
BY
Chas. E. Townsend
ATTORNEY

Patented July 12, 1938

2,123,660

UNITED STATES PATENT OFFICE 2,123,660

MAKING BEARINGS

Robert D. Pike, Piedmont, Calif., assignor to Kalif Corporation, Emeryville, Calif., a corporation of Delaware Application April 17, 1935, Serial No. 16,819

5 Claims. (Cl. 22—203)

In certain former applications, for example, my applications Serial No. 554,785, filed August 3, 1931, for Compound article and method of making the same, Serial No. 709,713, filed February 5, 1934, for Making bearings, and Serial No. 754,757, filed November 26, 1934, for Making bearings, I have described processes of welding plastic bronzes directly, autogenously, firmly, uniformly and integrally to iron or steel backing members, the resulting product being used in the manufacture of bearings having a plastic bronze bearing facing welded to an iron or steel supporting backing member.

As is well known, plastic bronzes present a bearing facing which has very desirable bearing characteristics, and the essential constituents thereof are, as a rule, copper or an alloy high in copper, together with lead, the lead contact running in practice anywhere from 15% to 20%, or less, up to 40% or 45%, or higher. Metals in addition to copper and lead are frequently present, generally for the purpose of forming a copper alloy and, as a matter of practice, these are generally present in amounts running from a fraction of 1% perhaps up to 5% more or less, the additional metals usually being tin or nickel, although others may be used.

In the applications above referred to and of which this application is a continuation in part as to common subject matter, the plastic bronze is cast in molten condition against the solid backing member. To obtain the above described type of weld, it is necessary that the interface between the steel and bronze be not below a certain temperature; and it is also desirable that the steel be not too hot and that the plastic bronze be not too hot. According to the above mentioned applications the desired working conditions can be attained by superheating the flux to about 2550° F. to 2750° F., say about 2650° F. The steel backing is generally heated to somewhere between 1450° F. and 1750° F., say about 1700° F.; while the plastic bronze is maintained at about 2000° F. to 2200° F., say about 2100° F. The bronze is somewhat above its melting point to prevent freezing thereof during the casting steps; and the backing is at, or a little below, or it may be even a little above the melting point of the bronze.

The superheated flux is contacted with the backing member not only to clean it but to impart heat to the face thereof and prepare it to receive the bronze so that when the bronze contacts the backing, welding is almost instantaneous, particularly at the above stated preferred temperatures, as a result of which the surface of the steel is made very hot by the flux for only a short period of time, that is, until the bronze contacts it. Welding being practically instantaneous, there is no harm in this being followed by practically immediate cooling.

The flux, as stated in my prior applications, is of the borax type and may consist of—

| | Per cent |
|---|---|
| Anhydrous borax | 80 |
| Cryolite | 10 |
| Boric acid | 10 | this having a melting point around 1100° F., so that at 2550° F. to 2750° F. it is not only very fluid, but chemically very active.

After casting and at suitable points in the cooling interval thereafter, the set-ups are cooled rapidly as by quenching.

An object of the present invention is to weld plastic bronze simultaneously onto the inner and outer sides of an iron or steel tube.

Another object of the invention is to weld plastic bronze on both sides and continuously over the edges of an iron or steel strip.

Another object of the invention is to make various types of bearings.

Other objects will become apparent on reading the appended specification.

Referring to the drawings, which form a part of this specification—

Figure 1:
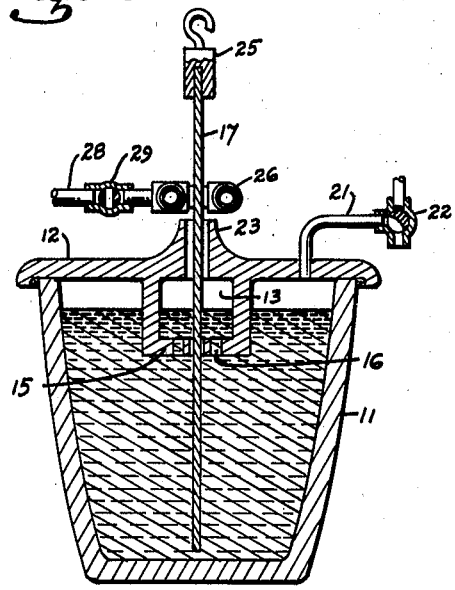
Fig. 1 is a sectional view illustrating one step of my process as applied to a strip.

I provide a receptacle or crucible 11 of material resistant to plastic bronze and fill it with such bronze in molten condition and at the above described temperature, namely, about 2000° F. to 2200° F., 2100° F. being a suitable working temperature; and I provide means (not shown) to maintain the receptacle and its contents at such temperature, the receptacle being preferably but not necessarily first heated up to the temperature at which it and its contents are to be maintained.

A gas-tight cover 12 is provided for the receptacle, the joint between the receptacle and cover being made tight by means of a sand-seal or other suitable connection. Integral with the cover is a well which has a cross section similar to that of the member to which the plastic bronze is to be welded. On Figs. 1 and 2, wherein I illustrate the process as applied to strips, this well 13 is preferably rectangular in cross section; while in Figs. 3 and 4, which illustrate the process as applied to tubing, the well 14 is preferably circular in cross section. The well 13 has a bottom lip 15 having perforations 16 therein, this lip serving to guide the strip 17, and in cooperation with a top suspension (not shown), it accurately aligns the strip to which the bronze is to be welded. The well 14 has a similar lip 18, likewise provided with perforations 19 to guide and align the tube 20 to which the bronze is to be welded. In each instance, the well preferably extends part way to the bottom of the receptacle 11.

In each instance a pipe 21 having a three-way valve 22 therein connects the upper part of the receptacle with a source of gas, air or steam under pressure (not shown), the three-way valve being so arranged that the flow of gas, air, or steam under pressure to the receptacle may be controlled or stopped, and so that it may be exhausted from the receptacle in case of necessity.

Figure 2:
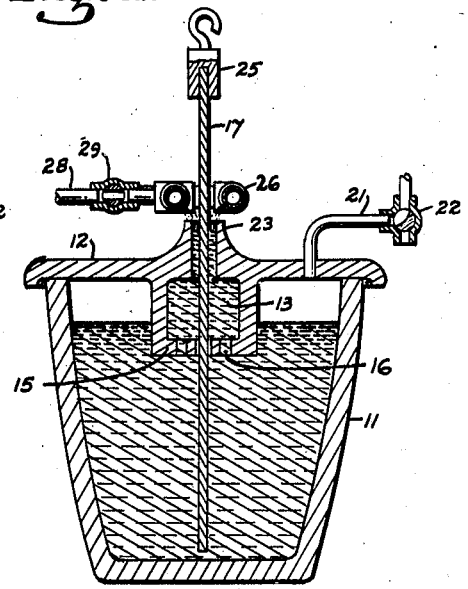
Fig. 2 is a similar view illustrating a later step.
Figure 3:
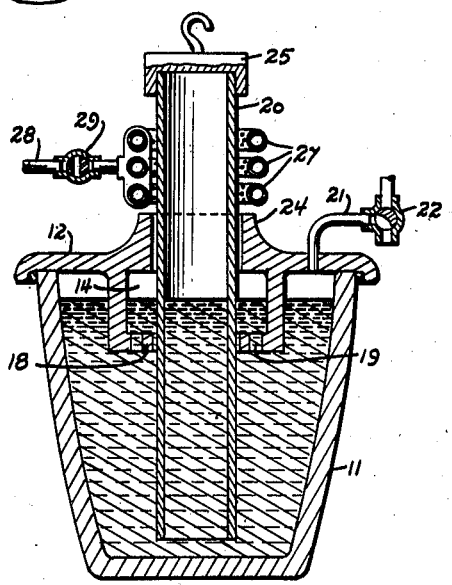
Fig. 3 is a view similar to Fig. 1 and illustrating the same step but as applied to a tube.
Figure 4:
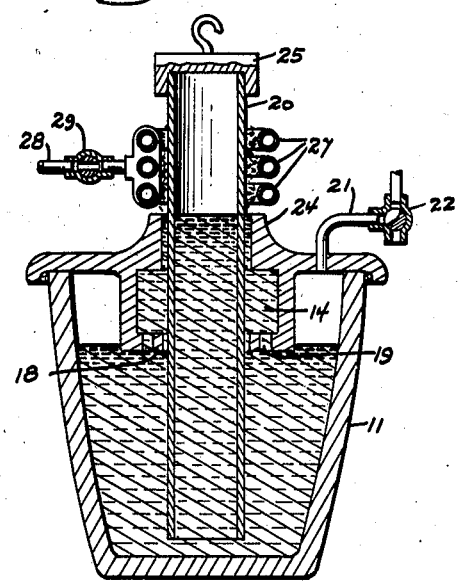
Fig. 4 is a view similar to Fig. 2 and illustrating the same step as applied to a tube.

The well 13 of Figs. 1 and 2 extends upwardly into a nozzle 23 having the shape and size of the outer dimensions of the dual metal object which it is desired to form; and the well 14 of Figs. 3 and 4 likewise extends upwardly into a nozzle 24 likewise being shaped and sized to deliver an article of the desired dimensions.

The strip 17 or tube 20 or other article to be treated is attached to a fastening member 25 which, in turn, is suspended from any suitable support (not shown).

I provide a cooling means comprising a coil 26 within which is a space similar in shape and size to the nozzle 23; and a coil 27 similar in shape and size to the nozzle 24, these coils being perforated to direct cooling fluid inwardly onto the corresponding nozzle. The coils are supplied from a source (not shown) of steam, air, atomized water, or suitable chilling agent by means of pipes 28, each having a valve 29 therein.

The strip 17 of Figs. 1 and 2, while shown as a simple strip, may have any desired form or cross section that the bearing art may call for; and the same is true of the tube of Figs. 3 and 4.

Figure 5:
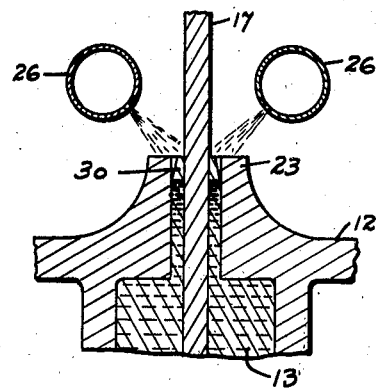
Fig. 5 is a sectional enlarged view of a portion of Fig. 2.

The article to which I desire to weld the plastic bronze, preferably made of steel although it may be made of iron, is heated up as above described, after which it is dipped into the superheated flux above described. This flux generally requires only a few seconds to prepare the article for welding, and the article is then carried directly over the nozzle 23 of Figs. 1 and 2 and 24 of Figs. 3 and 4 and lowered therethrough into the molten plastic bronze. Fluid pressure is then applied by manipulation of the valve 22 so as to raise the molten bronze to the top of the nozzle. At this instance the valve 29 is opened to direct the chilling agent from the spray-pipe onto the top of the nozzle to form a plug 30 (Fig. 5) in the case of the strip, of solidified bronze thereat, which is welded onto the fluxed strip 17 but not onto the resistant material of the nozzle. The nozzles may be of any suitable material and are preferably of metal resistant to the bronze, that is, to which the bronze will not weld.

Almost immediately a valve (not shown) is operated to cause a hoist (not shown) to lift the strip out of the well 23 while the cooling spray is still directed upon the nozzle. The result of this lifting and cooling, combined with pressure which maintains the level of the bronze in the nozzle, causes the steel strip to emerge with a coating of bronze welded on all surfaces. Auxiliary cooling pipes (not shown) may be provided to complete the chilling operation, if desired.

When a tube is being treated, as illustrated in Figs. 3 and 4, different effects may be obtained by varying the rate of cooling, the rate of upward movement of the tube and the space between the tube and nozzle wall.

Figure 6:
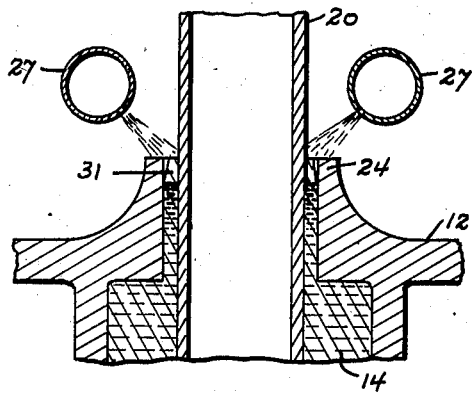
Fig. 6 is a similar enlarged view of a similar portion of Fig. 3.

An exterior plug 31 may be formed, as shown on Fig. 6, which plug may be lengthened as the tube is drawn upwardly while the nozzle is being chilled so as to provide an exterior facing of plastic bronze welded to the tube.

Figure 7:
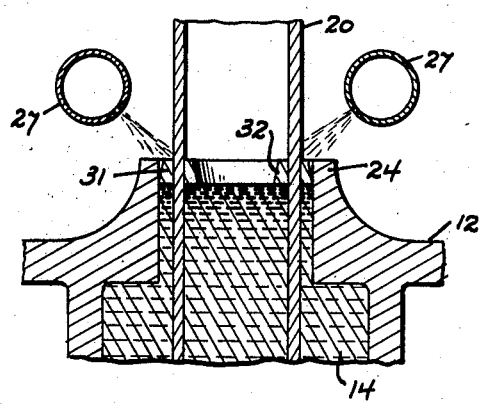
Fig. 7 is a similar enlarged view of a similar portion of Fig. 4.

On Fig. 7 I show exterior and interior plugs 31, 32, respectively, whereby exterior facings of the plastic bronze may be welded to the tube. Here, likewise, auxiliary cooling pipes (not shown) may be used to complete the chilling operation.

Figure 8:
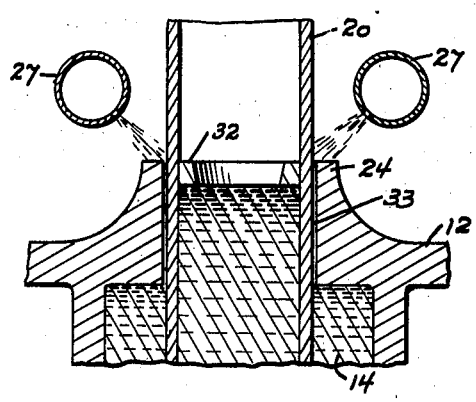
Fig. 8 is a view similar to Fig. 7 and showing a variation therefrom.

On Fig. 8 I show a very narrow space 33 between the tube and the nozzle so that most of the bronze welded to the tube will be on the inside thereof. Here, again, auxiliary cooling pipe (not shown) may be provided, if desired, to complete the chilling operation.

I find it preferable to melt the bronze and heat it to the desired temperature separately and then pour it into the receptacle 11 through the central well or in any other suitable manner and, if necessary, this may be done by moving the spray devices to one side.

I prefer to make my process a continuous one, that is, to insert a prepared strip into the receptacle 11 as soon as convenient after the preceding strip has been removed therefrom, and with this in view I prefer to suspend the strips on any suitable device which will move them into and out of place as desired.

After the dual metal articles have been made as above described, the strips may be bent to the desired form, and the strips and tubes may be cut and machined to form bearings.

I have referred to various details by way of illustrating the invention and not as a limitation thereof; and various features may be changed without departing from the spirit of the invention the scope of which is defined in the appended claims.

Having described my invention, what I claim and desire to secure by Letters Patent of the United States is:—

1. In an apparatus for cast-welding plastic bronze onto an iron or steel article, a container for said plastic bronze in molten condition, a nozzle on said container, the opening in said nozzle being larger than said article, a well at said nozzle and having an opening extending into said molten bronze, means to force compressed gas into said container, and means to cause a cooling spray to play at said nozzle.

2. In an apparatus for cast-welding plastic bronze onto an iron or steel article, a container for said plastic bronze in molten condition, a cover sealed on said container, a nozzle on said cover, the opening in said nozzle being larger than said article, a well on said cover at said nozzle and having an opening extending into said molten bronze, the walls of said opening functioning as a guide for said article, a pipe on said cover and leading into said container, means to force compressed gas through said pipe, and means to cause a cooling spray to play at said nozzle.

3. The method of making bearings by cast-welding plastic bronze onto an iron or steel tube by heating said tube, then treating the surface thereof to be welded with a molten flux and then replacing said flux with said bronze in molten condition, the temperatures of said tube and said bronze being insufficient to cause the maximum firmness of weld, the flux being superheated to a temperature at which heat is imparted to the surface of the tube to be welded to increase the firmness of the weld; said method being characterized by simultaneously passing said tube and said plastic bronze in molten condition through a nozzle, said plastic bronze being within and around said tube, rapidly chilling to freeze said bronze at the outlet end of said nozzle while maintaining it in molten condition at the inlet end thereof, and controlling the amount of deposition of said bronze on the inside of said tube by controlling the degree of said chilling.

4. In an apparatus for cast-welding molten metal onto a solid metal article, a container for the molten metal, a nozzle on said container having an opening larger than the solid metal article, a well at said nozzle having an opening and extending into the molten metal, means to force a gas under pressure into said container, and means to cause a cooling spray to play at said nozzle.

5. The method of making bearings by cast-welding a molten metal onto a metal tube which comprises passing the tube and the molten metal in molten condition through a nozzle, said molten metal being within and around the tube, chilling to solidify the molten metal at the outlet end of the nozzle while maintaining it in molten condition at the inlet end thereof, and controlling the amount of deposition of molten metal on the inside of the tube by controlling the degree of said chilling.

ROBERT D. PIKE.